(12) United States Patent
Le et al.

(10) Patent No.: US 10,639,758 B2
(45) Date of Patent: May 5, 2020

(54) POWER TOOL

(71) Applicant: Nanjing Chervon Industry Co., Ltd., Nanjing (CN)

(72) Inventors: Jun Le, Nanjing (CN); Yongtao Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 254 days.

(21) Appl. No.: 15/820,533

(22) Filed: Nov. 22, 2017

(65) Prior Publication Data

US 2018/0147681 A1  May 31, 2018

(51) Int. Cl.
| | | |
|---|---|---|
| *B23Q 11/00* | (2006.01) | |
| *B25D 16/00* | (2006.01) | |
| *B25D 17/20* | (2006.01) | |
| *B28D 7/02* | (2006.01) | |
| *B25F 5/02* | (2006.01) | |
| *B25F 5/00* | (2006.01) | |
| *B25D 17/04* | (2006.01) | |

(52) U.S. Cl.
CPC ...... *B23Q 11/0046* (2013.01); *B23Q 11/0071* (2013.01); *B25D 16/00* (2013.01); *B25D 17/043* (2013.01); *B25D 17/20* (2013.01); *B25F 5/003* (2013.01); *B25F 5/026* (2013.01); *B28D 7/02* (2013.01); *B25D 2211/061* (2013.01); *B25D 2217/0057* (2013.01); *B25D 2250/121* (2013.01)

(58) Field of Classification Search
CPC ............ B23Q 11/0046; B23Q 11/0071; B25D 16/00; B25D 17/043; B25D 17/20; B25D 2217/0057; B25D 2250/121
USPC .......................................................... 173/198
See application file for complete search history.

(56) References Cited

U.S. PATENT DOCUMENTS

| | | | | |
|---|---|---|---|---|
| 2010/0307782 A1* | 12/2010 | Iwata | ........................ | B25F 5/00 173/1 |
| 2013/0213683 A1* | 8/2013 | Brewster | ................ | B23Q 11/00 173/198 |

FOREIGN PATENT DOCUMENTS

CN          201669687 U     12/2010

* cited by examiner

*Primary Examiner* — Michelle Lopez
(74) *Attorney, Agent, or Firm* — Greenberg Traurig, LLP

(57) ABSTRACT

A power tool includes a tool main body including a first motor for outputting power to a tool attachment and a dust collecting device. The dust collecting device includes a fan, a second motor for driving the fan to rotate so as to generate absorbing force, a connecting assembly for connecting the dust collecting device with the tool main body detachably, a dust collecting housing connected movably with the connecting assembly in a front and rear direction. The second motor includes a stator and a rotor being capable of rotating relative to the stator about a first axis substantially perpendicular to the front and rear direction. The dust collecting housing is formed with a first containing chamber for containing the fan and a second containing chamber for containing dust absorbed by the dust collecting device.

10 Claims, 10 Drawing Sheets

POWER TOOL

RELATED APPLICATION INFORMATION

This application claims the benefit under 35 U.S.C. § 119(a) of Chinese Patent Application No. CN 201611061013.5, filed on Nov. 25, 2016, the disclosure of which is incorporated herein by reference in its entirety.

FIELD OF THE DISCLOSURE

The present disclosure relates generally to power tools and, more particularly, to a dust collecting device adapted for use with a power tool, such as an electric hammer and a drill.

REARGROUND OF THE DISCLOSURE

When electric hammers and drills are used to drill holes, a lot of dust is generated. So, it is needed to design a dust collecting device adapted for use with such tools.

Currently known dust collecting devices are usually disposed in a housing of the electric tool or connected with the housing of the electric tool directly. This arrangement can increase the volume of the electric tool, which is inconvenient for the operator.

The statements in this section merely provide background information related to the present disclosure and may not constitute prior art.

SUMMARY

In one aspect of the disclosure, a power tool is provided. The power tool includes a tool main body including a first motor for outputting power to a tool attachment and a dust collecting device. The dust collecting device includes a fan, a second motor for driving the fan to rotate so as to generate an absorbing force, a connecting assembly for connecting the dust collecting device with the tool main body detachably, a dust collecting housing connected movably with the connecting assembly in a front and rear direction. The second motor includes a stator and a rotor being capable of rotating relative to the stator about a first axis substantially perpendicular to the front and rear direction. The dust collecting housing is formed with a first containing chamber for containing the fan and a second containing chamber for containing dust absorbed by the dust collecting device.

In another aspect of the disclosure, a power tool is provided. The power tool includes a tool main body including a first motor for outputting power to a tool attachment, an auxiliary handle connected detachably with the tool main body and a dust collecting device comprising a fan and a second motor for driving the fan to rotate. The dust collecting device includes a dust collecting housing for containing the fan, a guiding rod for guiding the dust collecting housing to move relative to the tool main body in a front and rear direction and a connecting element for connecting the dust collecting device to the auxiliary handle detachably.

Further areas of applicability will become apparent from the description provided herein. It should be understood that the description and specific examples are intended for purposes of illustration only and are not intended to limit the scope of the present disclosure.

Figure 1:
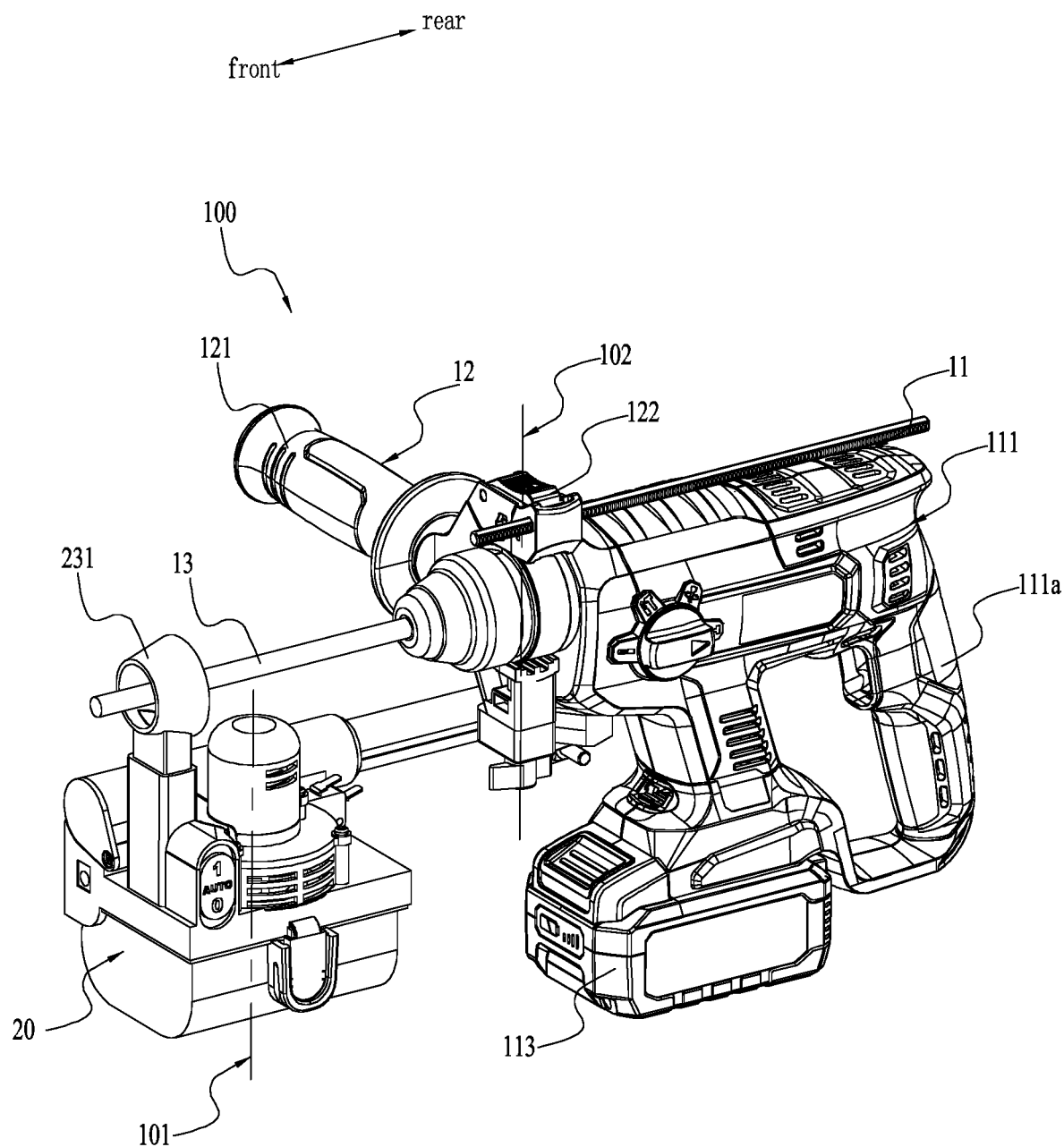
FIG. 1 is a schematic view of an exemplary power tool.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention, its application, or uses.

Figure 2:
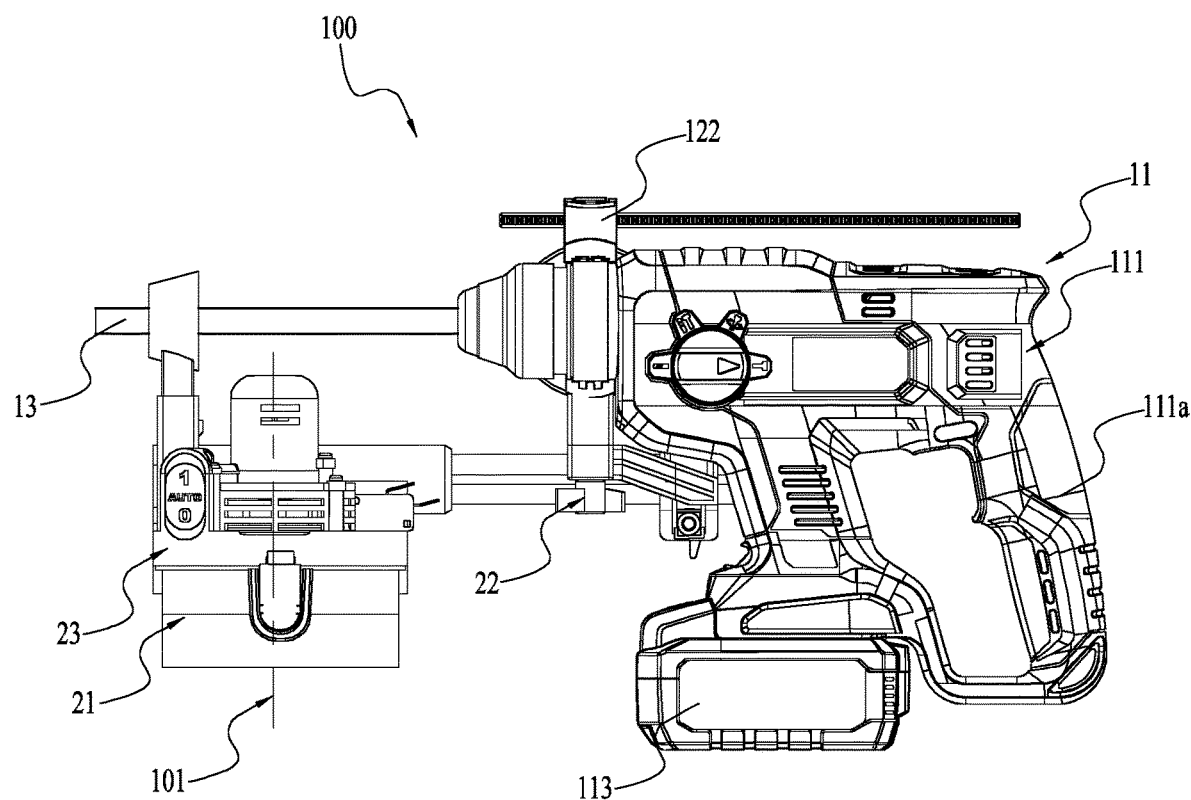
FIG. 2 a plane view of the power tool in FIG. 1.

Referring to FIGS. 1-2, a power tool 100 includes a tool main body 11, an auxiliary handle 12 and a dust collecting device 20. However, it can be understood that the auxiliary handle 12 can be considered as a part of the tool main body 11. The tool main body 11 may be a drill, a hammer, a screw driver, etc. Here, an electric hammer is taken as an example. A tool attachment 13 can be mounted on the tool main body 11. In this example, the tool attachment 13 is a bit.

Figure 3:
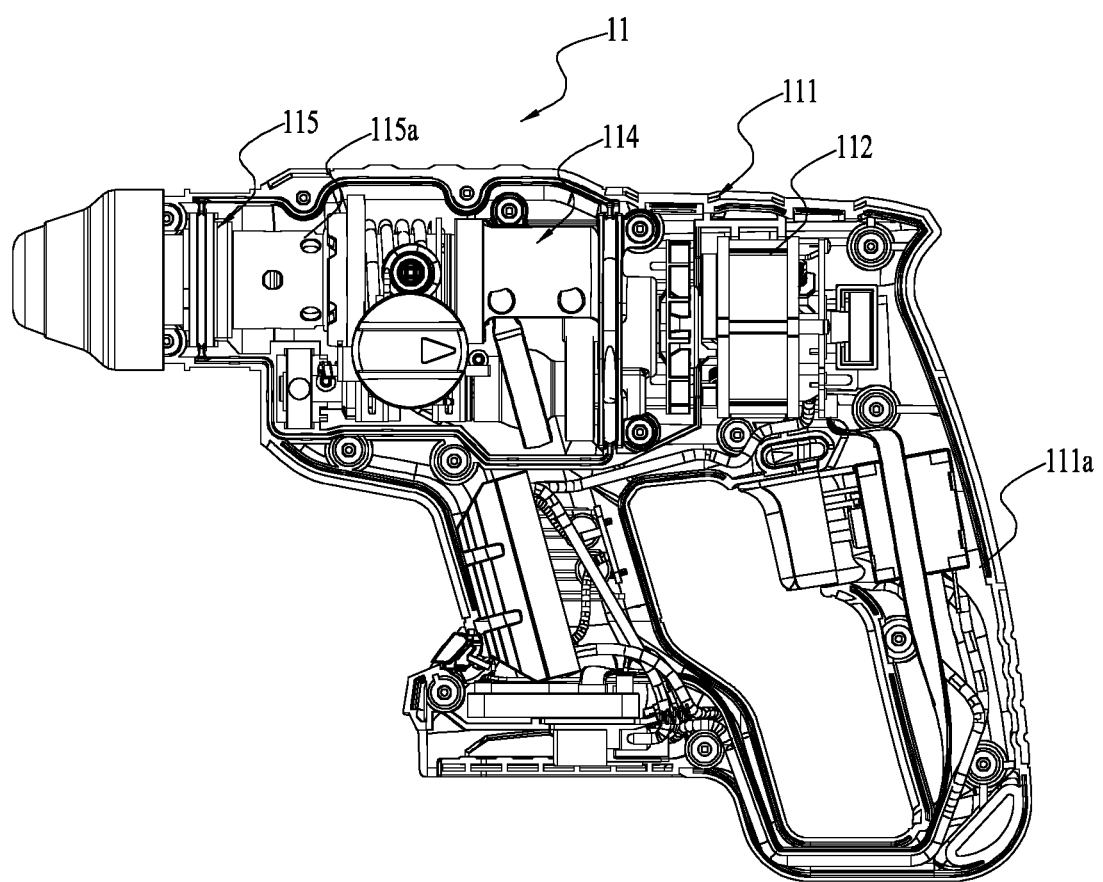
FIG. 3 is a schematic view showing a part of the inner structure of a tool main body of the power tool in FIG. 1.
Figure 4:
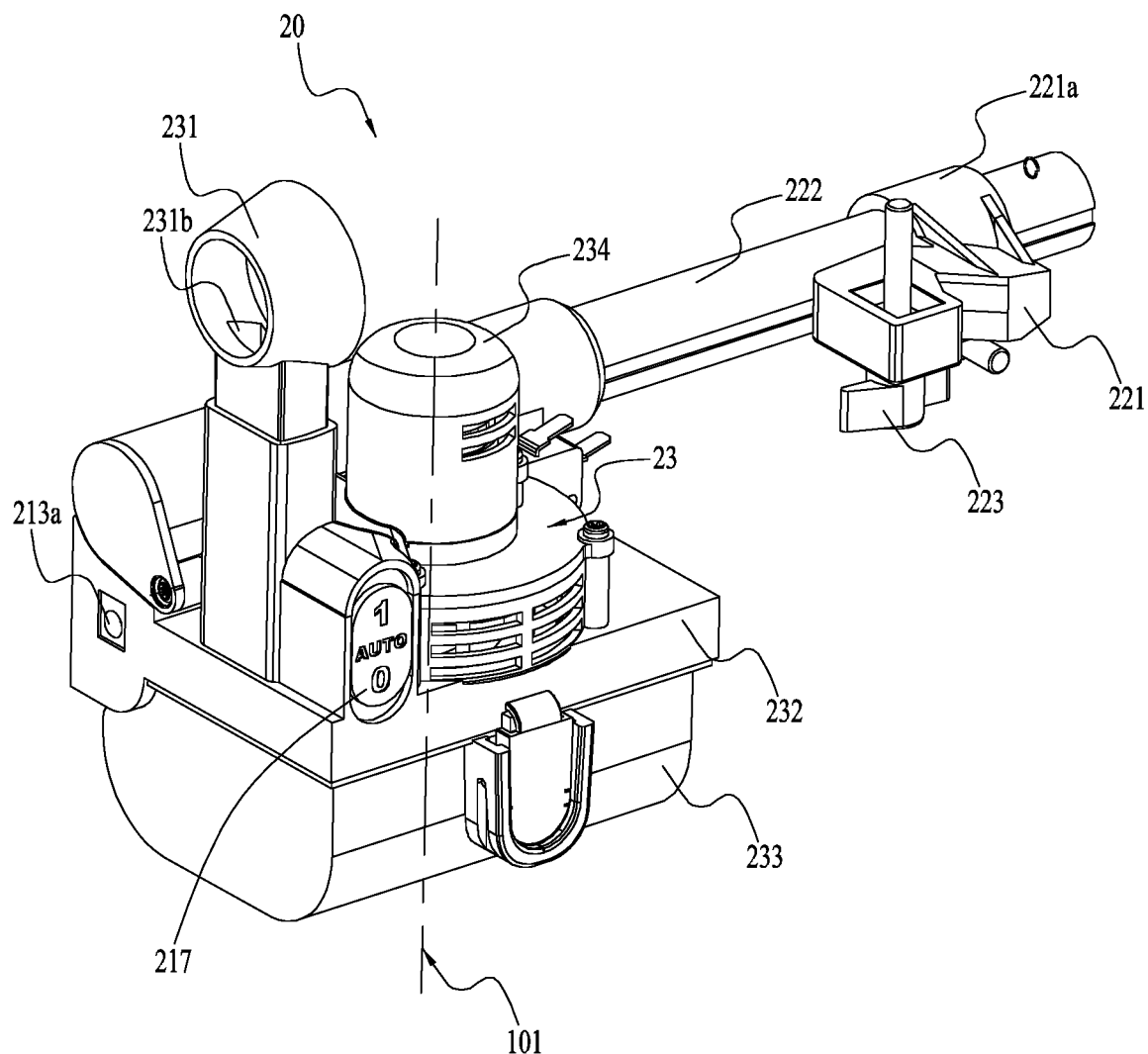
FIG. 4 is a schematic view of a dust collecting device of the power tool in FIG. 1.
Figure 5:
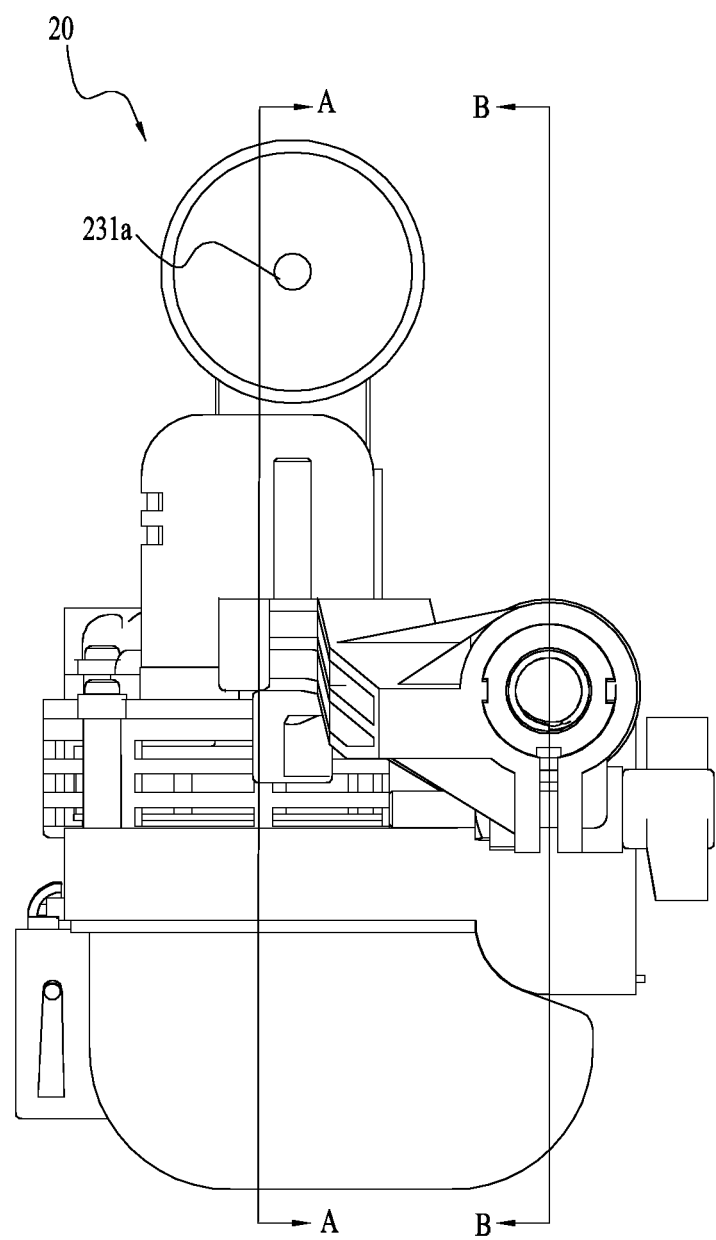
FIG. 5 is a plane view of the dust collecting device of the power tool in FIG. 1.
Figure 6:
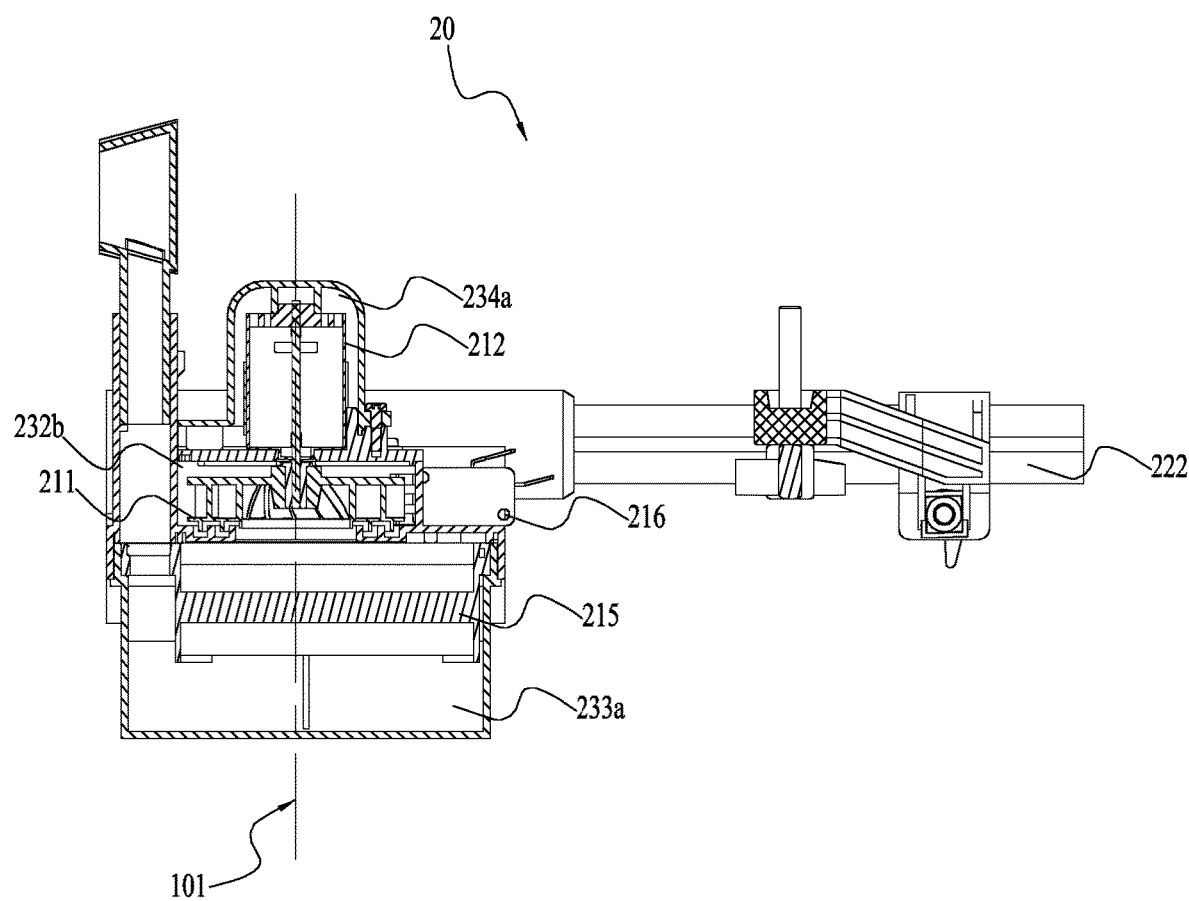
FIG. 6 is a section view of the dust collecting device cut along line A-A in FIG. 5.
Figure 7:
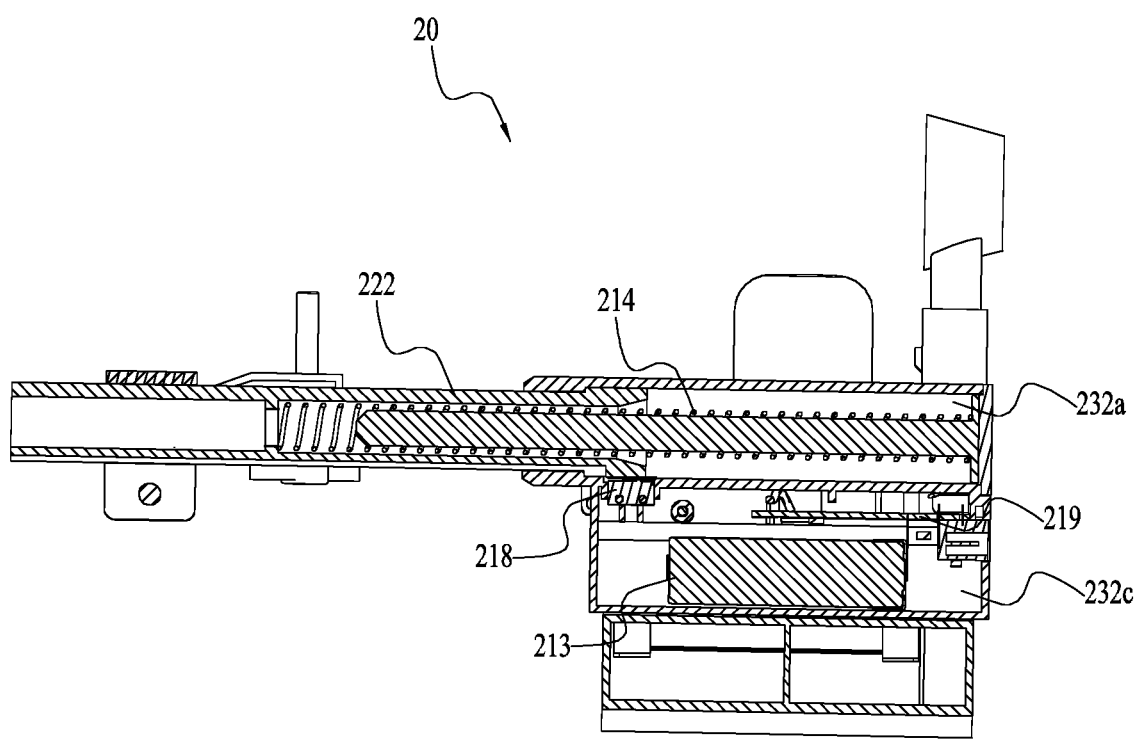
FIG. 7 is a section view of the dust collecting device cut along line B-B in FIG. 5.

As shown in FIG. 3, the tool main body 11 includes a tool housing 111 and a first motor 112. The tool main body 11 further includes a battery pack 113 for supplying power to the first motor 112. The battery pack 113 is coupled detachably with the tool housing 111. The tool housing 111 is formed with a main handle 111a for a user to grip so as to operate the tool main body 11. The first motor 112 for outputting power to the tool attachment 13 is disposed within the tool housing 111. Specifically, the tool main body 11 includes a transmission mechanism 114 and an output mechanism 115 disposed between the first motor 112 and the tool attachment 13. The transmission mechanism 114 and the output mechanism 115 are disposed within the tool housing 111. The transmission mechanism 114 is configured to transmit the power of the first motor 112 to the output mechanism 115. The output mechanism 115 includes an output shaft 115a for driving the tool attachment 13.

For illustrating the embodiment conveniently, a side of the tool main body 11 on which the tool attachment 13 is mounted is defined as a front of the tool, and the other side of the tool main body 11 on which the main handle 111a is formed is defined as a rear of the tool. The direction of a rotation axis of the output shaft 115a corresponds to the front and rear direction.

For the power tool 100 with a heavy weight, such as an electric hammer, the tool main body 11 is usually mounted with the auxiliary handle 12. The auxiliary handle 12 can be detached from the tool main body 11. During operation, the user grips the main handle 111a and the auxiliary handle 12 with his two ends respectively, so that the tool main body 11 is held steadily. The auxiliary handle 12 includes a handle portion 121 and a clamping portion 122. The handle portion 121 is used for the user to grip, and the clamping portion 122 is used to engage with the tool housing 111 so that the auxiliary handle 12 can clamp to the tool housing 111 detachably.

As is known, the tool main body 11 generates dust during operation, especially for the electric hammer. The electric hammer generates a lot of dust during drilling process. Thus, the dust collecting device 20 is needed to absorb the dust so as to prevent the dust from moving freely in the environment.

The dust collecting device 20 includes a dust collecting assembly 21 and a connecting assembly 22. The dust collecting assembly 21 for absorbing the dust is connected slidably with the connecting assembly 22 in the front and rear direction. So, the dust collecting assembly 21 is able to change its position based on different states of the tool attachment 13 during operation. For example, for the electric hammer, when the bit is drilling holes, as the hole becomes deeper, the dust collecting assembly 21 is expected to move rearward and close to the tool main body 11 in the front and rear direction. The connecting assembly 22 includes a connecting element 221 for connecting the dust collecting device 20 with the tool main body 11 detachably. Further, the connecting assembly 22 is connected with the auxiliary handle 12 detachably, and the auxiliary handle 122 is connected with the tool main body 11 detachably. So, the tool main body 11, the auxiliary handle 12 and the dust collecting device 20 can be separated from each other or combined as a whole. And the application range and usage mode of the power tool 100 is improved.

Referring to FIGS. 4-7, the dust collecting assembly 21 includes a dust collecting housing 23, a fan 211, a second motor 212 and a battery 213. The fan 211, a second motor 212 and a battery 213 are disposed within the dust collecting housing 23. The fan 211 can be driven by the second motor 212 to rotate so as to generate an absorbing force. The second motor 212 is an electric motor specifically. The battery 213 is used to supply power to the second motor 212. The second motor 212 includes a stator and a rotor. The rotor is able to rotate relative to the stator about a first axis 101 which is substantially perpendicular to the front and rear direction. The first axis 101 can be considered as a rotation axis of the second motor 212. So, the second motor 212 is disposed within the dust collecting housing 23 in the direction of the first axis 101. On the one hand this arrangement can reduce the volume and weight of the tool main body 11, and on the other hand this arrangement can make the dust collecting assembly 21 have a reasonable construction so as to reduce the volume of the dust collecting device 20, which is beneficial to realize miniaturization of the dust collecting device 20. The battery 213 can be a rechargeable battery. The dust collecting housing 23 can be formed with a charging interface 213a allowing the battery 213 to be charged.

The dust collecting housing 23 is connected slidably with the connecting assembly 22 in the front and rear direction. More specifically, the connecting assembly 22 includes a guiding rod 222 for guiding the dust collecting housing 23 to slide relative to the tool main body 11 in the front and rear direction. The dust collecting housing 23 is formed with a sliding hole 232a. An end of the guiding rod 222 which is closest to the dust collecting housing 23 is extended into the sliding hole 232a. A spring 214 is disposed within the sliding hole 232a, which rests against the guiding rod 222 and the dust collecting housing 23. So, during the operation of the tool main body 11, the dust collecting housing 23 is rested against a working surface, and with the working process moves forward, the dust collecting housing 23 is able to move backward close to the tool main body 11 relative to the tool main body 11 in the front and rear direction under the guidance of the guiding rod 222. Thus, the object of absorbing dust effectively is reached.

Specifically, the dust collecting housing 23 further includes a dust collecting hood 231 which is formed with a hole 231a. The hole 231a allows the tool attachment 13 to pass there through. The dust collecting hood 231 is further formed with a dust collecting opening 231b close to the hole 231a. So, when the tool attachment 13 is driven by the tool main body 11 to operate, the dust generated can be absorbed into the dust collecting housing 23 through the dust collecting opening 231b. In the front and rear direction, the second motor 212 is disposed between the first motor 112 and the dust collecting opening 231b. Thus, the size of the whole power tool 100 is further reduced.

The dust collecting housing 23 is formed with a first containing chamber 232b, a second containing chamber 233a, a third containing chamber 234a and a forth containing chamber 232c. The first containing chamber 232b is used to contain the fan 211. The second containing chamber 233a is used to contain the dust absorbed by the dust collecting device 20. The third containing chamber 234a is used to contain the second motor 212. The forth containing chamber 232c is used to contain the battery 213. Here, the first containing chamber 232b, the second containing chamber 233a, the third containing chamber 234a and the forth containing chamber 232c can be communicated with each other or isolated from each other. And each part of the dust collecting housing 23 being formed with the first containing chamber 232b, the second containing chamber 233a, the third containing chamber 234a and the forth containing chamber 232c respectively can be formed separately and then connected as a whole or integrated directly. The second containing chamber 233a and the third containing chamber 234a are disposed on the two sides of the fan 211 respectively. Thus, the construction of the dust collecting housing 23 is more compact and reasonable.

In this example, in order to generate effective absorbing airflow and absorb the dust effectively, the dust collecting opening 231b is communicated with the second containing chamber 233a, and the second containing chamber 233a is communicated with the first containing chamber 232b. And in order to stop the dust accessing the second motor 212 and the battery 213, the third containing chamber 234a is not communicated with the first containing chamber 232b and the forth containing chamber 232c is not communicated with the first containing chamber 232b.

More specifically, the dust collecting housing 23 includes a main housing 232, a dust box 233 and a motor housing 234. The main housing 232 is mounted slidably on an end of the guiding rod 222 which is far from the tool main body 11. So, the main housing 232 can be formed with the sliding hole 232a allowing the guiding rod 222 to extend there into. The main housing 232 also can be formed with the first containing chamber 232b for containing the fan 211 and the forth containing chamber 232c for containing the battery 213. The dust collecting hood 231 is disposed detachably on the main housing 232. So, the user can change to a different dust collecting hood 231 according to a different tool attachment 13.

The dust box 233 is coupled detachably with the main housing 232 so as to form the second containing chamber 233a. A filter box 215 is disposed within the dust box 233, which is mounted detachably on the second containing chamber 233a. So, when the dust in the dust box 233 is too much, the user can detach the dust box 233 from the main housing 232 and dump the dust. When the filter box 215 is used for a long time, the user can change it or change the filter paper in the filter box 215. Further, the dust collecting device 20 includes a safety switch 216 which can be activated by the filter box 215 when the filter box 215 is mounted on the dust box 233. The safety switch 216 can be turned on/off by the filter box 215. When the user does not set the filter box 215 in the dust box 233, the second motor 212 is not allowed to be activated by the safety switch 216. While when the filter box 215 is mounted in the dust box 233, the safety switch 216 allows the second motor 212 to be activated by the user.

The motor housing 234 is configured to form the third containing chamber 234a for containing the second motor 212. The motor housing 234 is mounted on the main housing 232. For example, the motor housing 234 can be fixed on the main housing 232 through screws or fasteners. The second motor 212 is disposed in the motor housing 234 along the first axis 101 which is substantially perpendicular to the front and rear direction. Further, the second motor 212 and the dust box 233 are disposed on the two sides of the fan 211 respectively in the direction of the first axis 101. So, the construction of the whole dust collecting assembly 21 is further compact, and the volume is further reduced.

Figure 8:
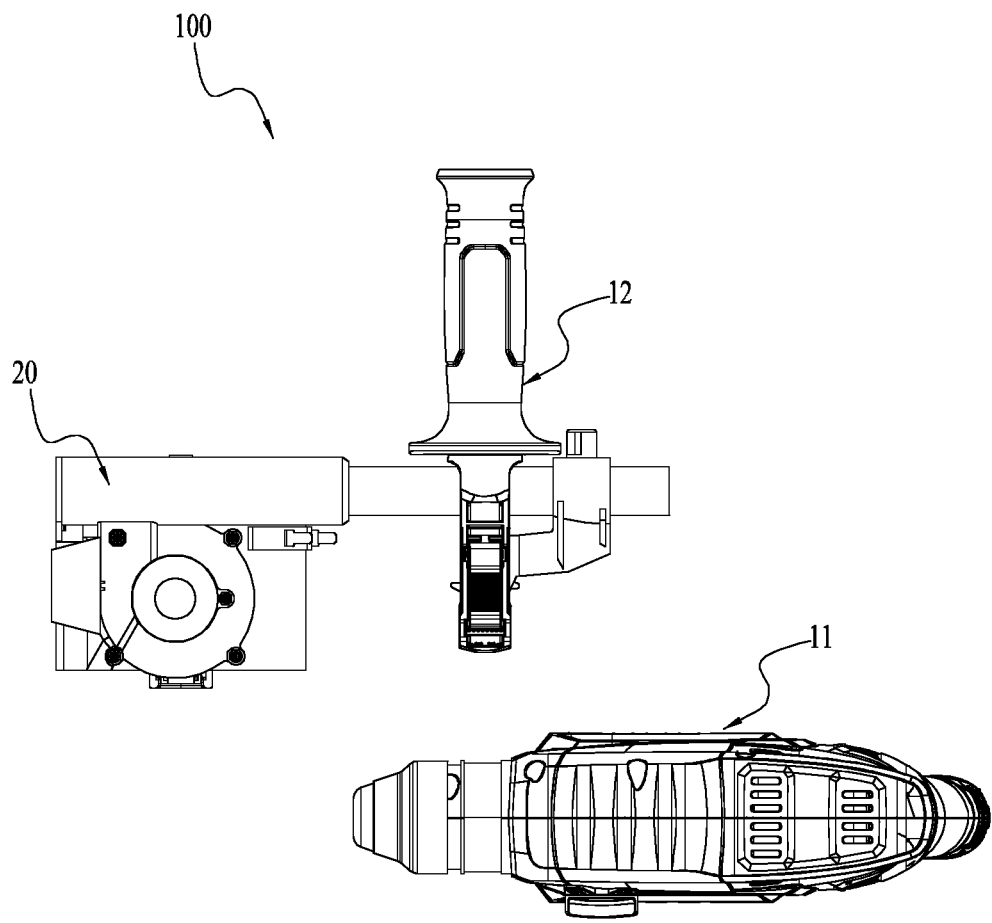
FIGS. 8-9 are schematic views of the power tool, wherein an auxiliary handle is detached from the tool main body.
Figure 9:
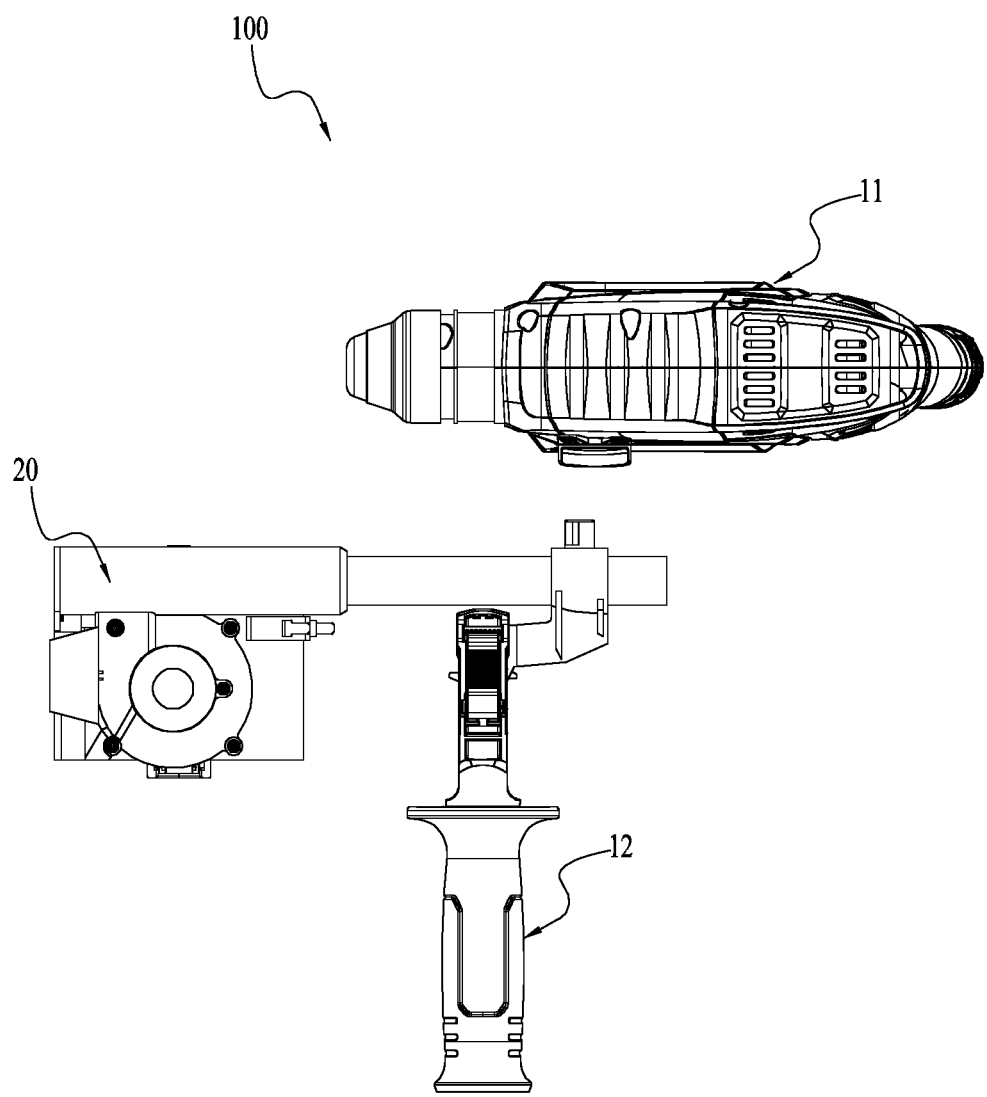
Figure 10:
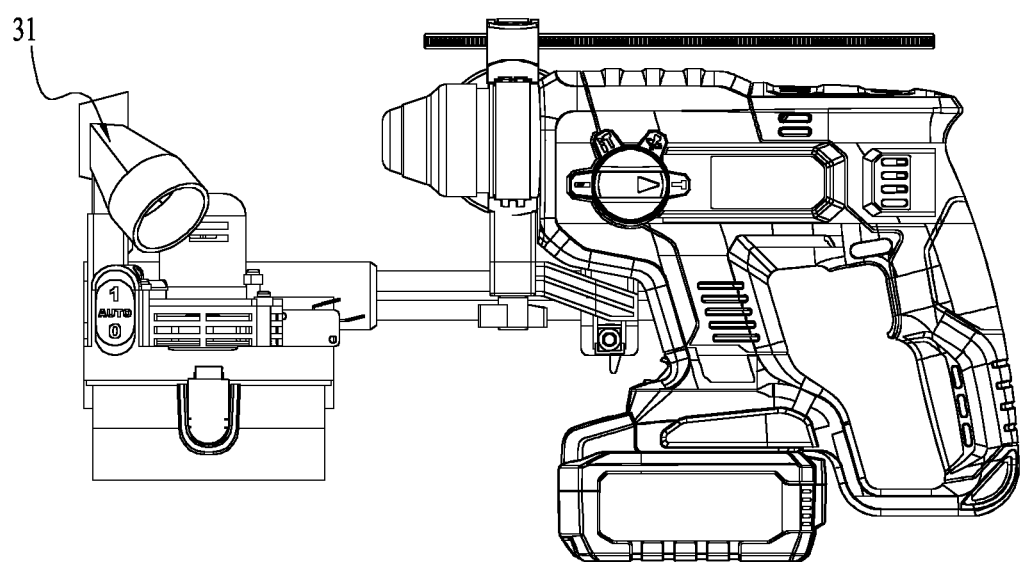
FIG. 10 is a schematic view of the power tool in FIG. 1, wherein a vacuum head of a vacuum cleaner is connected with the power tool.

The connecting assembly 22 includes a knob 223. The connecting assembly 22 is connected with the guiding rod 222 on its one end and connected rotatably with the clamping portion 122 of the auxiliary handle 12 on the other end through the knob 223. When the user loosens the knob 223, the auxiliary handle 12 can be rotated relative to the connecting element 221 about a second axis 102. The second axis 102 is substantially perpendicular to the front and rear direction and perpendicular to the length direction of the handle portion 121 of the auxiliary handle 12. So, when the user detaches the whole constituted by the dust collecting device 20 and the auxiliary handle 12 from the tool main body 11, the knob 223 is loosened first, and then the auxiliary handle 12 is rotated to make the auxiliary handle 12 rotate to the positions in FIGS. 8 and 9 respectively. The two positions in FIGS. 8 and 9 are suitable for the left-handed and right-handed users. So, it is convenient for the user to operate and use.

Otherwise, the connecting element 221 includes a connecting portion 221a for connecting detachably with the guiding rod 222. The connecting portion 221a allows the connecting element 221 to connect with the guiding rod 222 at different positions along a longitudinal direction. So, when the user mounts the dust collecting device 20, he can adjust the extending length of the guiding rod 222 relative to the connecting element 221 in the front and rear direction in advance, so as to allow for use of the device 20 with tool attachments 13 having different lengths.

The dust collecting device 20 further includes a main switch 217 allowing the dust collecting device 20 to be in an automatic mode. When the dust collecting device 20 is in the automatic mode and the filer box 215 is mounted in the dust box 233, the dust collecting device 20 rests against the working surface and the dust collecting housing 23 slides a certain distance relative to the tool main body 11 in the front and rear direction, the second motor 212 is started to absorb dust. While when the dust collecting housing 23 restores to its original position, the second motor 212 is stopped. Specifically, a trigger switch 218 is disposed on the dust collecting housing 23 and close to the sliding hole 232a. When the dust collecting housing 23 slides on the guiding rod 222 to make the guiding rod 222 contact with the trigger switch 218, the trigger switch 218 is triggered so as to start the second motor 212. While when the dust collecting housing 23 slides on the guiding rod 222 to make the guiding rod 222 disengage with the trigger switch 218, the second motor 212 is stopped.

A circuit board 219 is disposed in the dust collecting housing 23. A time-delay circuit for controlling the second motor 212 to delay stopping is disposed on the circuit board 219. So, when the user turns off the main switch 217, the time-delay circuit controls the second motor 212 to operate continuously for a preset time. Thus, the dust in the dust collecting channel can be absorbed thoroughly.

Referring to FIGS. 1-10, it will be appreciated that, when there is a lot of dust or the user needs to work for a long time, the user can use a professional and large vacuum head 31 of a vacuum cleaner instead of the dust collecting hood 231.

The above illustrates and describes basic principles, main features and advantages of the invention hereinafter claimed. Those skilled in the art should appreciate that the above embodiments do not limit the claimed invention in any form. Technical solutions obtained by equivalent substitution or equivalent variations all fall within the scope of the claimed invention.

What is claimed is:

1. A power tool, comprising:
   a tool main body comprising a first motor for outputting power to a tool attachment; and
   a dust collecting device comprising:
      a fan;
      a second motor for driving the fan to rotate so as to generate an absorbing force;
      a connecting assembly for detachably connecting the dust collecting device with the tool main body; and
      a dust collecting housing connected movably with the connecting assembly in a front and rear direction;
   wherein the second motor comprises:
      a stator; and
      a rotor being capable of rotating relative to the stator about a first axis substantially perpendicular to the front and rear direction; and
   wherein the dust collecting housing comprises:
      a main housing forming a first containing chamber for containing the fan; and
      a dust box detachably couplable to the main housing and forming a second containing chamber for containing dust absorbed by the dust collecting device, and
   wherein the second motor and the dust box are disposed on opposite sides of the fan in a direction of the first axis.

2. The power tool of claim 1, wherein the dust collecting housing is further formed with a dust collecting opening communicated with the second containing chamber and the second motor is disposed between the first motor and the dust collecting opening.

3. The power tool of claim 1, wherein the dust collecting housing is further formed with a third containing chamber for containing the second motor and the second containing chamber and the third containing chamber are disposed on two sides of the fan respectively.

4. The power tool of claim 1, wherein the dust collecting device further comprises a filter box disposed detachably in the second containing chamber and a safety switch being capable of stopping the second motor from being activated by a user when the filter box isn't set in the second containing chamber.

5. The power tool of claim 1, wherein the dust collecting device further comprises a battery for supplying power to the second motor and the dust collecting housing is formed with a forth containing chamber for containing the battery.

6. The power tool of claim 1, wherein the tool main body comprises a tool housing comprising a main handle for a user to grip so as to operate the tool main body and an auxiliary handle comprising a clamping portion for clamping on the tool housing wherein the auxiliary handle is detachably connected with the connecting assembly.

7. A power tool, comprising:
a tool main body comprising a first motor for outputting power to a tool attachment;
an auxiliary handle detachably connected with the tool main body; and
a dust collecting device comprising a fan and a second motor for driving the fan to rotate;
wherein the dust collecting device comprises:
a dust collecting housing for containing the fan;
a dust box detachably couplable to the dust collecting housing;
a guiding rod for guiding the dust collecting housing to move relative to the tool main body in a front and rear direction; and
a connecting element for connecting the dust collecting device to the auxiliary handle detachably, and
wherein the second motor and the dust box are disposed on opposite sides of the.

8. The power tool of claim 7, wherein the connecting element is connected with the guiding rod detachably and the connecting element comprises a connecting portion allowing the connecting element to connect with the guiding rod at different positions.

9. The power tool of claim 7, wherein the dust collecting device comprises a battery contained in the dust collecting housing.

10. The power tool of claim 7, wherein the second motor is contained in the dust collecting housing, and the second motor comprises a stator and a rotor being capable of rotating relative to the stator about a first axis substantially perpendicular to the front and rear direction.

* * * * *

UNITED STATES PATENT AND TRADEMARK OFFICE
CERTIFICATE OF CORRECTION

Page 1 of 1

PATENT NO. : 10,639,758 B2
APPLICATION NO. : 15/820533
DATED : May 5, 2020
INVENTOR(S) : Jun Le and Yongtao Li It is certified that error appears in the above-identified patent and that said Letters Patent is hereby corrected as shown below:

On the Title Page

Column 1, After Item (22) please insert:
-- (30)   Foreign Application Priority Data
Nov. 25, 2016   (CN)   201611061013.5 --

Signed and Sealed this
Twenty-third Day of June, 2020

Andrei Iancu
*Director of the United States Patent and Trademark Office*